United States Patent [19]

Thornton et al.

[11] Patent Number: 5,244,716
[45] Date of Patent: Sep. 14, 1993

[54] STRETCHABLE FABRICS AND ARTICLES MADE THEREFROM

[75] Inventors: Jeremy J. Thornton, Grimston; Allen Halliwell, Snettisham, both of England

[73] Assignee: Porvair PLC, Norfolk, England

[21] Appl. No.: 424,220

[22] PCT Filed: Feb. 8, 1989

[86] PCT No.: PCT/GB89/00119
§ 371 Date: Dec. 4, 1989
§ 102(e) Date: Dec. 4, 1989

[87] PCT Pub. No.: WO89/07523
PCT Pub. Date: Aug. 24, 1989

[30] Foreign Application Priority Data
Feb. 9, 1988 [GB] United Kingdom ............... 8802933

[51] Int. Cl.⁵ ............................................. B32B 27/14
[52] U.S. Cl. .................................... 428/198; 2/239;
2/243.1; 156/183; 156/210; 156/229; 156/291;
428/182; 428/245; 428/246; 428/253; 428/247;
428/152; 428/304.4
[58] Field of Search ............... 428/284, 198, 145, 253,
428/286, 304.4, 152, 247, 246, 182; 156/229,
291, 183, 210; 2/239, 243 A

[56] References Cited

U.S. PATENT DOCUMENTS

| 4,194,041 | 3/1980 | Gore et al. ........................ 418/315 |
| 4,443,511 | 4/1984 | Worden et al. .................... 428/198 |
| 4,446,189 | 5/1984 | Romanek ........................... 428/300 |
| 4,761,324 | 8/1988 | Rautenberg et al. ............. 428/198 |
| 4,935,287 | 6/1990 | Johnson et al. ................... 428/284 |

FOREIGN PATENT DOCUMENTS 797523 7/1958 Great Britain .

Primary Examiner—James J. Bell
Attorney, Agent, or Firm—Nies, Kurz, Bergert & Tamburro

[57] ABSTRACT

A composite extensible material useful for making a clothing article comprising a first film layer resistant to penetration by liquid water by permeable to water vapor adhered at discrete securement locations to a second layer of water vapor vapor permeable extensible sheet material. The adherence between the two layers is such that when the composite material is under zero stretching load and resting on a flat surface the second layer is substantially flat and the first layer is corrugated, ruched or puckered. The adherence is also such that the composite material can be stretched by at least 10% in at least one direction by a load less than that required to stretch the first layer by the same amount on its own.

14 Claims, 6 Drawing Sheets

STRETCHABLE FABRICS AND ARTICLES MADE THEREFROM

This invention is directed to waterproof but breathable articles of clothing, to be worn in place of or in addition to conventional garments under conditions where a given part of the body would otherwise get wet through exposure to the elements (e.g. outdoor sports, mountain climbing). The articles of clothing of this invention protect the body from being wetted from external sources but allow the natural breathing process of the body (transmission and removal of perspiration in the form of water vapour) to continue undisturbed, thus ensuring a high degree of comfort to the wearer.

The present invention encompasses a number of independently advantageous features and extends to a compatible combination of such features as well as the novel features and aspects per se.

The invention applies to a variety of articles of clothing such as stockings, gloves, hats and others but will later be illustrated by the example of stockings and gloves.

Stockings are extensible close fitting articles of footwear which when properly sized snugly engage the surface of the foot and ankle of a wearer or the foot, ankle and leg of the wearer without leaving spaces between the stocking and the foot and ankle or the stocking and the foot, ankle and leg.

The present invention extends to a stocking made of a material comprising a barrier component comprising a film or membrane layer resistant to penetration by liquid water, i.e. a layer which is hydrophobic, but permeable to water vapour, the said component having an extensibility such that when worn the stocking fits closely to the surface of the foot, ankle and leg, the stocking being such that it can readily be drawn onto and off the foot and over the ankle.

Such a product has hitherto been unavailable, closeness of fit being sacrificed to waterproofness in those articles providing waterproofness and breathability which are boot-like in shape and commercially available and waterproofness being sacrificed to fit in conventional knitted stockings.

The invention also extends to an article of footwear incorporating a film or membrane layer, enclosing the foot, ankle and leg in use, resistant to penetration by liquid water but permeable to water vapour, the said layer constituting an envelope having a value of $(lb1+lb2)/lf$ (as defined herein) of less than 1.5 and preferably not more than 1.4.

As discussed below such an $(lb1+lb2)/lf$ value differentiates from conventional articles.

The invention also extends to a stocking in which the barrier component comprises a film or membrane layer resistant to penetration by liquid water but permeable to water vapour adhered to a second layer of extensible water vapour adhered to a second layer of extensible water vapour permeable material, the barrier component being such that it can be extended by at least 50% in the direction of the line B (the heel to front of ankle line), preferably by a load not in excess of 0.4 kg/cm width (as measured by the text described herein), e.g. less than 0.3 and preferably not in excess of 0.2 kg/cm width.

Preferably the hydrophobic layer has a hydrostatic head in excess of 100 preferably in excess of 200, 300, 400, 500 or 600 and especially 700 cms $H_2O$, and a WVP in excess of 20 preferably in excess of 50 and especially in excess of 100 g per square meter per hour. Such a stocking affording this combination of mutually conflicting properties of hydrostatic head, and WVP, and extensibility, has so far as we are aware not been available heretofor.

In a preferred form of this aspect of the invention a stocking comprises an inner fabric layer and a separately formed hydrophobic polymer layer resistant to penetration by liquid water but permeable to water vapour, the stocking being seamless or having no more than one seam which is located in the polymer film.

The stocking may be a short so called ankle length stocking which extends just above the top of the shoe or boot or a longer one e.g. of mid calf or calf length or longer, such as thigh length, and preferably extends above the boot top in such longer lengths. In a preferred embodiment of this aspect of the invention the stocking comprises an inner textile layer, an intermediate film or membrane layer resistant to penetration by liquid water but permeable to water vapour and an outer textile layer, the arrangement of the layers being such that the socking can readily be drawn onto and off the foot and over the ankle.

Preferably the said layers are connected to each other at least proximate the opening to the interior of the stocking through which the foot is introduced in use.

The stocking may be characterised by three tranverse dimentions which will be referred to as A, B and C. These are measured on the stocking when it is arranged flat and folded about its front and rear lines. The longest transverse dimention we call B and this is the shortest distance from the point of the heel to the front of the ankle; this is the largest transverse dimention to which a stocking has a stretch as it is drawn onto the foot.

The second dimension C is the transverse dimension halfway along the foot from the mid point MH of the heel/ankle line to the toe. We define C as being the length of the perpendicular at the mid point MC of the line from the mid point MH of the heel to ankle line to the toe. The length B is the sum of lb1 and lb2 which we have defined as being equal. The length C is the sum of lc1 and lc2 which may or may not be equal. The distance from MH to MC is lf.

A is the transverse dimension across the leg portion of the stocking taken the same distance lf up the leg from the heel to front of ankle line B as C is taken down the foot.

The line about which A is taken is the line from MH to the mid point MO of the line across the opening or top of the stocking. A is the perpendicular to the line MH-MO. If the opening or top is closer to MH than the distance lf then A is taken at the place nearest the opening which allows A to extend from side to side of the stocking. The dimension A defines the closeness of fit of the stocking around the leg above the ankle and a close fit here is important to prevent or hinder water running down the leg and into the interior of the stocking.

The dimensions C and particularly B determine the closeness of fit around the ankle and foot whilst the dimension B to a large extent defines the ease or indeed whether the stocking can be drawn onto the foot. Thus there is a conflict inherent in a foot covering made of material of low extensibility or of high resistance to initial stretch (initial modulus) between the closeness of fit which can be obtained and the need to provide a shape with sufficient space to allow the foot to be placed inside the covering.

In a mans fashioned stocking the ratio of A to B to C is typically 0.7:1:0.8. However sports stockings are made which are tubular and there the ratio is 1:1:1.

Thus more broadly we prefer stockings in which the ratio of A to B and of C to B is in the range 0.5:1 to 1:1.

Structures in which the ratio of A to B is greater than 1:1 are liable to require too much stretching at the ankle region; thus either the leg portion of the stocking fails to fit closely or if a close fit is achieved there, it will be very difficult to draw the stocking on to the foot and if this can be done the ankle will be liable to be excessively restricted and discomfort produced.

The layer resistant to penetration by liquid water but permeable to water vapour is a polymeric film preferably a microporous polymer film, which is flexible e.g. being thin e.g. from 5 microns upwards e.g. 10 to 120 microns or more e.g. 200 e.g. 20 to 120 e.g. 30 to 70 microns thick. So long as the film functions adequately as a water barrier it can be of any thinness desired and so long as the article remains snugly close fitting in the case of a stocking or adequately flexible in the case of other products it can be of any thickness desired. The values given are however appropriate and preferred. Desirably the material is inherently flexible. Elastomeric polymers are particularly useful. (Suitable classes of materials are described in more detail below, but this aspect of the invention at least is not limited to these or any other classes of materials from which this layer is made).

When the material is described as resistant to penetration by liquid water this is the desired function it should perform; it is not intended to restrict the penetration of water under all conditions but rather to provide a useful barrier so as to keep the foot dry under most conditions likely to be met with during wear and/or to do so for significantly longer periods than would be possible with a conventional stocking. Similarly reference to permeability to water vapour is a reference to the desired function that the layer be breathable so that perspiration generated by the foot can transpire through the stocking also helping keep the foot dry but in a different respect.

The problem in attempting to achieve these objectives with currently available microporous materials is that they have initial moduli significantly higher than knitted materials from which stockings are made, and thus are difficult to draw on to the foot over the ankle to give a close fit.

We have found a way of providing structures which are waterproof and breathable whilst having low initial moduli which thus make close fitting stockings in accordance with the first aspect of the present invention attainable.

These structures are also useful in clothing articles and articles of luggage, containers and sleeping bags.

The invention also has special utility in articles of clothing where reversible stretching has to be accommodated such as at the elbows and knees.

The invention is also useful for other articles which need easily to accommodate reversible stretching while remaining water proof.

Thus according to this second aspect of the invention a clothing article (as defined herein), an article of luggage or a container or a sleeping bag comprises a barrier component consisting of an inner fabric layer and a film or membrane layer resistant to penetration by liquid water but permeable to water vapour adhered to the fabric layer at a multiplicity of locations, the arrangement being such as to provide an element of lost motion between the fabric layer and the film or membrane layer.

A clothing article (as defined herein) is a stocking, or a glove or mitten, a jacket or coat or anorak or a garment having arms, a pair of trousers or a garment having legs, a dry suit, an article of headgear or a garment having a hood.

The layer resistant to penetration by liquid water but permeable to water vapour is preferably afforded by a single layer of hydrophobic microporous polymer film, which is flexible and 5 to 200 microns thick.

The film or membrane resistant to penetration by liquid water but permeable to water vapour, i.e. the hydrophobic layer, which for ease of reference may also be referred to as the waterproof, breathable layer, has a hydrostatic head in excess of 100 preferably in excess of 200, 300, 400, 500 or 600 and especially 700 cms $H_2O$, and a WVP in excess of 20 preferably in excess of 50 and especially in excess of 100 g per square meter per hour.

Thus in this aspect of the present invention the article comprises a barrier component consisting of a first film or membrane layer adhered at discrete securement locations to a second layer of water vapour permeable extensible sheet material, the adherence being such that when the barrier component is under zero stretching load and resting on a flat surface the second material is flat or substantially so and the first material is corrugated, ruched or puckered.

The invention also extends to a glove comprising at least an inner textile fabric layer, an intermediate film or membrane layer resistant to penetration by liquid water but permeable to water vapour and an outer layer, the inner layer and the intermediate layer constituting a barrier component, the intermediate layer being adhered to the inner layer at a multiplicity of locations, the arrangement being such as to provide an element of lost motion between the inner fabric layer and the intermediate layer such that whilst the glove fits closely to the hand and fingers, the fist can still be easily clenched.

The inner textile fabric may be a seamless knitted fabric glove or a glove assembled from that knitted fabric e.g. by stitching, the knitted fabric preferably being a lightweight fabric.

The invention also extends broadly to the ruched composite per se.

According to a third aspect of the present invention a composite extensible material comprises a barrier component consisting of a first film or membrane layer resistant to penetration by liquid water but permeable to water vapour adhered at discrete securement locations to a second layer of water vapour permeable extensible sheet material, the adherence being such that when the composite is under zero stretching load and resting on a flat surface the second material is flat or substantially so and the first material is corrugated, ruched or puckered or otherwise gathered.

Preferably the barrier component can be extended by at least 50% in at least one direction by a load not in excess of 0.4 kg/cm width e.g. less than 0.3 and preferably not in excess of 0.2 kg/cm width, and preferably less than 0.15 Kg/cm width (as measured by the test described herein).

It is also preferred that the adherence is such that the composite can be stretched by at least 10% in at least one direction by a load less than that required to stretch the said first layer on its own.

The second layer is preferably a knitted or woven fabric having a looped structure on at least one surface and the first layer is adhered to the said looped surface.

The first layer preferably has a thickness in the range 10 or preferably 20 to 120 microns.

The first layer is preferably made of polyurethane based on essentially linear polyol and diisocyanate.

The first layer is preferably of a material which can be thermally bonded to itself to form a waterproof seam.

The composite may be made by adhering the first layer to the second layer by adhesive located between the free ends of the loops of the second layer and the first layer e.g. by being applied to the loops of the second layer.

The composite is preferably one in which the ratio of the surface area of the first material to the plan area of the second material under zero stretching load conditions (the ruching factor) is at least 1.1:1, preferably 1.2:1 e.g. in the range 1.1:1 to 5:1, 4:1 or 3:1 especially 1.2:1 to 2:1 e.g. about 1.3:1 to 1.8:1 especially about 1.5:1.

According to another aspect of the present invention in a method of making a composite material an extensible second material, or inner fabric layer, is stretched in at least one direction by at least 10% preferably at least 20% and especially at least 50%, e.g. at least 100% or 150% e.g. 50-100% and a first material, or layer resistant to penetration by liquid water but permeable to water vapour, is juxtaposed to the stretched second material while the first material is in an unstretched or less stretched state, discontinuous adhesive is provided between the two layers and the two layers are adhered whilst the second layer at least is held in the stretched state.

In a preferred form of this aspect of the invention after the layers are adhered with the second layer held in the stretched state, the composite is released so that the second layer contracts, or is treated so that the second layer contracts and the first layer thereby adopts a corrugated, ruched or puckered configuration.

The adhesive may be applied to one surface of the second layer (the extensible fabric), the second layer may then be stretched so as to ensure the discontinuity of the adhesive, and the first layer in unstretched or less stretched state may then be juxta-posed to the adhesive bearing surface of the second layer and adhered thereto.

It will be appreciated that the inverse of this method can be used whereby the adhesive is applied to the first layer. In addition a scrim or net of adhesive can be interposed between the two layers and then bonding effected.

In one preferred aspect of the present invention the second material is a fabric which is readily stretchable in at least one direction by at least 20% (e.g. a warp knitted fabric), and the first material is a film or membrane layer resistant to penetration by liquid water but permeable to water vapour, capable of being joined to itself in a permanent and continuous manner so as to produce a waterproof joint. This layer is preferably a polymeric film.

The composite can be used for making shaped articles of clothing as described below.

Whilst there exist polymeric films capable of substantial extension before reaching break point, a simple composite of the first and second material, adhered over their whole areas and each of the same area, when made into a shaped article, e.g. a stocking would be difficult to put onto the foot because of the degree of extension that would be locally necessary to accommodate the heel. If this were to be overcome by making the upper part of the stocking very wide, say 1.5 times the girth of the ankle, such a stocking would be unacceptable to the wearer as it would not be tight fitting in the lower leg. Furthermore, conventional breathable waterproof polymeric films, when unduly stretched, may be liable to develop flaws and lose their waterproofness or even become fractured.

These drawbacks are avoided by the special manner of producing the preferred composite according to the third aspect of present invention in which a) adhesive is applied to the readily extendable fabric in its unextended state, b) the fabric is then extended, e.g. stretched in at least one direction by between 20 and 500%, thus introducing discontinuities into the adhesive and is joined to the layer of polymeric film, the latter being in a relaxed (unextended) condition, and c) the composite is then allowed or is caused to recover preferably to as close as possible the dimensions of the fabric prior to it having been extended whereby the layer assumes a puckered or corrugated or crumpled or ruched configuration in relation to the fabric. The recovery may be spontaneous or may be assisted by subjecting the composite to a treatment involving exposure to steam, dry heat or to combinations of either of these treatments with mechanical tumbling. The composite so produced can be subsequently extended at least to the dimensions of the layer of polymeric film at the time of joining it to the fabric, without the layer of film becoming stretched or coming under strain.

It will be appreciated that the precise mechanism by which differential change in dimensions of the fabric and the film is caused to occur after they have been adhered together is not critical. For example the fabric could be made of fibres or yarn (or have a fabric structure) which will shrink when exposed to conditions under which the film does not shrink or under which it shrinks less, though clearly the adherance of the layers must be achievable without causing any significant degree of change in area of the fabric or film and the adhesion must survive the conditions used to produce the differential change in dimensions.

The composite produced in accordance with this aspect of the invention can be used in the manufacture of shaped articles of clothing which retain the advantages of waterproofness, breathability, extensibility and comfort possessed by this composite, and also protection from chilling by wind. The wearer of articles including stockings made from the composite thus perceives them to be windproof.

The ruched structure has the effect when not fully stretched, of forming air pockets and may therefore have some thermally insulating effect in addition to its other advantages.

The advantageous properties possessed by the composite of the present invention make it extremely useful where the ability to accommodate localized reversible stretching without loss of waterproofness is needed.

The invention is not dependent on the method by which the composite is made up into articles. However as an example, a tubular article e.g. a tubular stocking can be made by forming a tube from a sheet or sheets of the composite material. This may conveniently be done by positioning the polymeric material on the inside of the tube and bonding together contacting faces thereof.

Thus a tube could be formed by folding over a single sheet and forming one side seam (and a bottom seam if one end is to be closed, as for a stocking) or by superimposing two plies polymeric face to polymeric face and forming two side seams and a bottom seam if desired.

Such structures may have somewhat bulky seams because the fabric will be involved in the seam; we thus prefer stocking structures and indeed tubular structures in general such as gloves where the fabric component is present as a seamless tube or tubes.

Thus alternatively and preferably a tube of the film material can be formed (which will not have a bulky seam) and a seamless tube or tubes of a fabric in extended or stretched condition adhered to its interior. Thus the fabric could be placed on an oversize former e.g. of stocking or glove shape to stretch it and the polymeric film wrapped around it and adhered to it and be seamed or sealed to itself to form a tube or glove shape. When the tubular composite is drawn off the former the fabric will retract, or can be caused to retract, resulting in the film adopting a ruched or corrugated configuration. Obviously fashioned tubular articles such as for example anoraks or smocks or long stockings reaching up to the thigh for use with waders could be knitted so as to have increasing diameters or varying diameters along the leg or could have a number of panels or have panels which are not rectangular. Such panels e.g. of different shapes could be bonded to each other by seams and sub assemblies could be produced first.

Bonding the composites to each other polymeric face to face enables a waterproof seam to be produced because the films can be caused to form a continuous bond. This bonding can be done in a variety of ways, among them by the use of heat welding or by high frequency welding. The use of adhesives has the advantage of increasing the strength of the bond. If a welding process is used, the finished shape may be pre-cut, cut subsequently to the welding or cut-welded in a single 2-step process in which additional pressure is applied by the cut-welding head for the cutting step after the welding.

If the tubular article so produced is now turned inside out, the fabric is brought to the inside and polymeric layer to the outside. The article, e.g. a stocking, can then be worn directly in contact with the appropriate part of the body, e.g. the leg, with optionally an additional stocking, e.g. a knitted stocking e.g. of wool e.g. of heavy yarn, on the outside. This loose assembly ensures protection and comfort to the body through affording a soft and preferably absorbent surface in contact with the body, a barrier to penetration of water from the outside, and the ability to transmit and remove to the outside any water vapour originating from perspiration.

In a further aspect of this invention, the inner two layer composite is secured to an outer layer e.g. a fabric layer such as in the form of a conventional knitted stocking or an outer glove e.g. of leather or imitation leather or textile fabric e.g. of knitted or woven structure. This may be achieved by a variety of techniques. The use of adhesive between the polymeric layer and the third or outer fabric layer is satisfactory, but care must be taken to ensure that the product remains supple. This can be achieved if the adhesive is applied in a discontinuous configuration (as spaced dots, lines or a netting) rather than as a continuous layer. Heat activatable adhesives may be used to connect the film to the inner fabric by application of heat and pressure in a first stage and then whilst the film is still planar (and the inner fabric is extended) the other face of this film may also be connected to the outer material (whilst it is extended) in a second stage of application of heat and pressure.

Alternatively the bonding of the unextended film to the two extended fabrics may be carried out in a single stage of heat and pressure. This may be done by locating a net of adhesive, preferably a stretchy net, e.g. of thermoplastic polyurethane between the film and the inner fabric and the film and the outer layer. Another way of achieving adhesion is by printing a discontinuous pattern of adhesive, e.g. dots, a network, or lines or a combination thereof on one or preferably both faces of the film. The adhesive is preferably heat activatable, e.g. an aqueous dispersion of thermoplastic hot melt adhesive may be used, and can be printed onto the film and dried before the assembly is made and then its adhesive properties activated by heat and pressure.

Another approach is to insert an additional weldable or bondable layer, e.g. a synthetic scrim, between the two faces of the polymeric layer along all or part of the length of the seam or join, e.g. the side seam or seams and the bottom seam or any of them, disposed so as to be inside the tubular shape in its configuration at the time of welding, and to extend inwardly of the weld region. The material of this layer is chosen to be such that the waterproofness of the seam is not impaired, e.g. it may be compatibly weldable or otherwise bondable to the polymeric layer.

As described above, the tubular shape is next turned inside out so that the polymeric layer is on the outside and the fabric on the inside. Any length of the tab providing layer incorporated in the weld will in this configuration protrude outwards affording a tab or tabs for connection to a component which in the finished article will be disposed outside the polymeric film relative to the interior of the article.

If a continuous sheet of the tab providing layer had been used across the whole width of the tubular shape (as could be the case in which the tubular shaped article had been formed from two layers of the composite seamed down each edge), it would be cut prior to or after turning the article inside out, and thereafter trimmed to a desired shape so as to form a tab or flap-like overhang alongside the whole or part of the seam.

A technique which may be easier to carry out in production is to provide a double layer scrim sized to be larger than the flattened out form of the two layer composite so that when juxtaposed to the composite the scrim affords an overhang or tab extending around and outwardly from the edge of the composite over the whole or a desired part of its perimeter.

This scrim may be secured to the composite by any technique which does not destroy the integrity of the polymeric waterproof envelope. For example an adhesive which may be a powder, dispersion, solution or discontinuous netting is applied to the outer surface of the polymeric layer when it is in its extended state, the adhesive dried (if necessary) and the extending force removed. A bag of the scrim (which can be seamless) sized to be the same size or slightly smaller than the extended two layer composite is slid over the collapsed composite, the extending force applied once more and the adhesive activated so as to bond the scrim to the polymeric layer, when the assembly is in the extended state. The extending force is then removed and the three layer composite allowed to collapse. The extending force is preferably applied by an expandable former which may be mechanical or pressure fluid (e.g. gas or liquid operated or may utilize a combination of these. The overhang of the scrim is utilized to secure the outer fabric layer to the composite.

Thus the outer fabric in the form of a tubular article of clothing, e.g. of conventional construction and appearance, e.g. a knitted woollen stocking, is next turned inside out and the previously formed tubular shape made from the composite provided with a tab or tabs or the overhang afforded by the scrim is secured to the tubular article at desired locations e.g. by means of a line of stitches through the tabs or overhang and the article. This can be achieved by placing the outer fabric article (inside out) on a former, which may be the three-dimensioned former described above but which need only be two-dimensional and indeed which may be preferable. This tubular article is preferably slightly longer than the composite so as to enable a turned over cuff to be formed.

The former is expanded and the composite is also expanded either manually or on another former which need only be two dimensional and the tabs or the overhang of the scrim attached by stitches to the inside of the outer fabric e.g. at opposite sides of the foot and leg.

The former or formers are then collapsed and the structures removed from them and the assembly turned so that the outer fabric is on the outside, the scrim is next, then the polymeric layer and finally the inner fabric forms the lining which will contact the skin of the users foot in use. The cuff, if provided, is turned down and preferably held down by being stitched to itself above the top edge of the polymeric layer. This mode of joining avoids any perforation of the polymeric waterproof layer so that its waterproofness remains unimpaired.

In this three layer embodiment of the invention the total construction is then turned inside out once again, and in that configuration the outer fabric tubular article e.g. the stocking is on the outside, the breathable and waterproof polymeric layer forms the middle layer, and the fabric becomes the inner layer.

In this configuration, the composite may be secured to the outer article along the whole or part of the protruding length of the tab or tabs or overhang.

In another sequence of operations the attachment of the outer fabric layer to the inner two layer composite is achieved by first securing the scrim to the outer fabric layer e.g. by stitches and then securing this outer two layer composite of fabric and scrim to the inner two layer composite of polymeric film and fabric.

In more detail this sequence may be as follows. The bag of scrim is made as described above but the overhang is no longer essential, the scrim being able to be directly secured to the outer fabric layer by stitches in the absence of the membrane layer. The outer fabric layer is turned inside out placed on the former and expanded. The scrim is placed over the inside out expanded outer fabric on the former and attached to its inside face by stitches e.g. by running two or more lines of stitches through the scrim and the outer fabric.

The former is collapsed and the outer composite removed.

The inner two layer composite is placed on the former with the polymeric layer facing outwards. The former is then expanded. Adhesive is applied as described above, dried if necessary and the former collapsed. The outer composite is turned inside out so that the scrim is on the inside and is then placed over the inner composite on the former. The former is expanded and the adhesive activated. The remaining procedure is as described above.

Both these sequences permit the use of seamless inner and outer tubular fabrics (though they may have a toe closure seam) and attachment of the inner two layer composite to the outer fabric by stitching (which may produce a more supple product than the use of adhesive) without impairing the integrity of the polymeric layer. The scrim may be a stitched two layer product or could be a seamless tubular net produced by net extrusion techniques such as are the subject of the NETLON (Registered Trade Mark) patents, or by knitting in which case the diameter of the tube can be varied along its length; it can indeed, be a loosely knitted lightweight fashioned stocking. The scrim can and preferably is of light weight e.g. weighing of the order of 20 g/sq meter e.g. 5 to 50 g/sq meter.

The presence of the scrim adhesively secured to the polymeric layer but secured by stitches, which give a good loose flexible connection, to the outer fabric gives a flexible supple product without risk of impairment of the integrity of the polymeric layer.

Direct adherence by adhesives of the polymeric layer to the outer fabric could be liable give a less flexible product while direct stitching of the polymeric film would impair the waterproofness.

The invention also extends to the four layer composite which results from these procedures.

Thus according to this aspect of the present invention a tubular article of clothing e.g. a stocking comprises a seamless inner tubular fabric enclosing the foot or foot and ankle or foot, ankle and leg in use, the inner fabric being adhered to an intermediate film or membrane layer which is resistant to penetration by liquid water but permeable to water vapour, the inner layer and the intermediate layer consisting a barrier component, the intermediate layer being adhered by adhesive to a light weight scrim, the scrim being secured non-adhesively to an outer seamless tubular fabric.

The scrim may be secured to the outer fabric by individual spaced apart stitches or by one or more lines of stitches. However the essence of the securement is to keep the components associated with each other in use e.g. in use or during laundering rather than to be such as to resist significant pulling forces. Thus structures on or in the scrim which engage fibres in the outer fabric could be sufficient to secure the scrim to the outer fabric for the purposes of the present invention.

When the article is a stocking the composite is desirably attached to the top of the assembled article e.g. by means of a double-sided adhesive tape, a hook and loop, e.g. Velcro, fastener or even by stitching, the total article of clothing remaining breathable and waterproof at least up to the line of stitching.

The constructional principles of the present invention, i.e. forming the film/fabric composite with the fabric in an extended condition, and either inserting a bondable tab providing layer in the join between two surfaces of the polymer layer or affording the intermediate scrim layer, and using an overhang of the tab providing layer or using the scrim for joining the composite to an outer article, or alternatively adhering the film to a scrim which is in turn secured to an outer article, can equally be applied to articles of clothing other than stockings e.g. gloves, hats, dry suits, jackets and trousers, and raincoats. Other articles to which the invention may be applied include luggage, such as rucksacks, and sports bags e.g. to provide compartments for separating wet articles from dry and sleeping bags.

The close fitting stocking or glove is preferably seamless or has no more than one seam which is located in the polymer film, and any such seam is a waterproof seam, e.g. a welded seam.

The inner fabric layer and the outer fabric layer and, if present, the scrim can readily be made in seamless tubular form. The permeable film can be made in sheet form by conventional techniques which permit ready control of properties including thickness, permeability and extensibility. The sheet can be made into tubular form by wrapping and welding to itself to provide a flat seam which will not be uncomfortable to the user, if indeed its presence is recognised.

Seamless tubular articles are already known to be capable of being made by dipping and coagulation techniques such as are described in our copending British Patent Application No. 8525866 Serial No. 2181691 for making gloves. Application of such techniques to stocking shapes may be expected to present problems of thickness control although application of such techniques is thought likely to be feasible.

Such problems make the use of a seamless permeable tubular article less desirable though not to be excluded.

In order to be used in the present invention such seamless articles would be made substantially oversize so that on securement to an extended fabric liner and on collapse thereof they would become ruched, puckered or corrugated.

The invention may be put into practice in various ways and a number of specific embodiments will be described with reference to the accompanying drawings, in which, FIG. 1 is a diagrammatic cross-sectional view of a composite material in accordance with the present invention in the unstretched condition;

Figure 6:
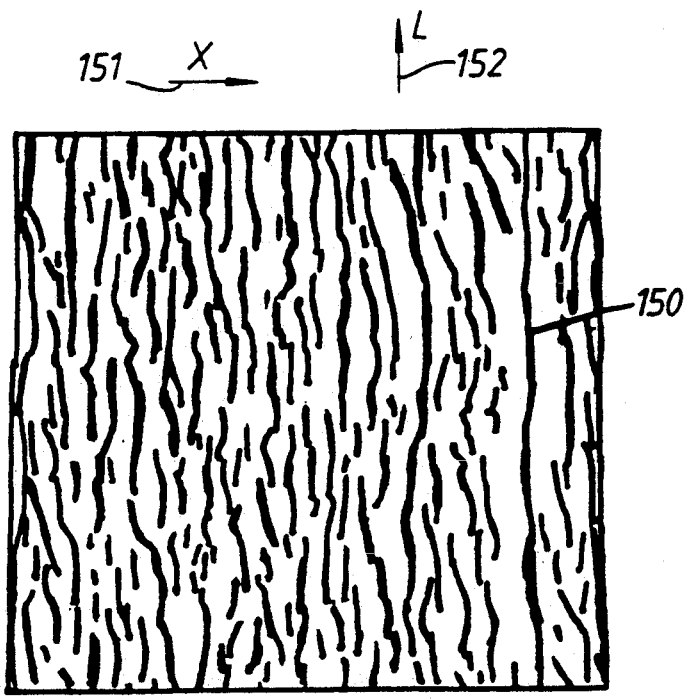
FIG. 6 is a diagramatic plan view of a tubular composite in accordance with the present invention in the configuration shown in FIG. 4 but without the outer stocking and without tabs in the side seams, illustrating the puckered, ruched or corrugated configuration of the film or membrane.
Figure 7:
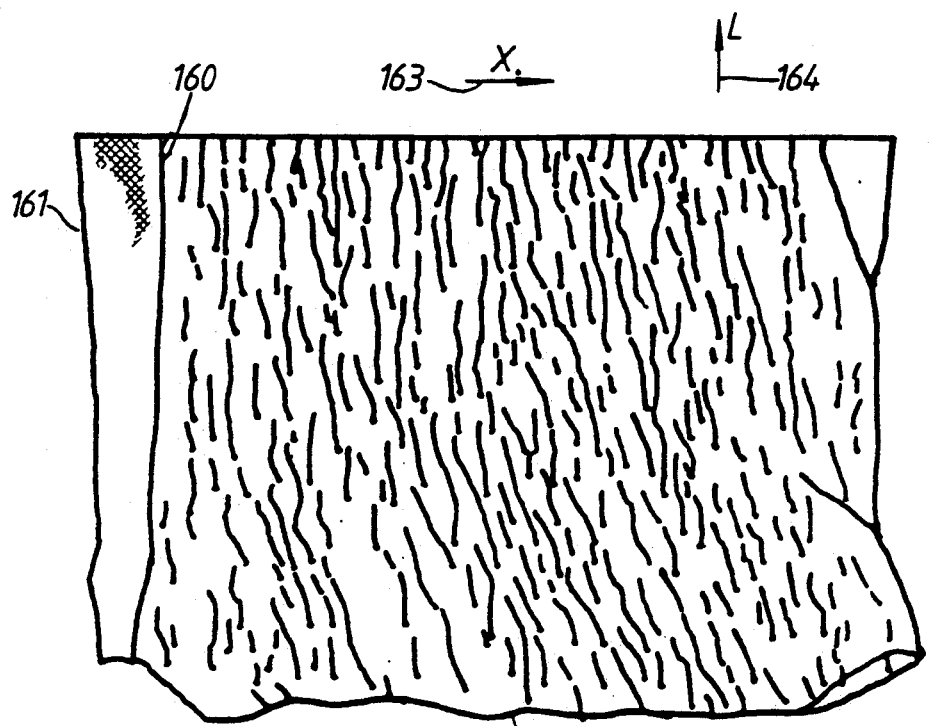
FIG. 7 is a view similar to FIG. 6 but showing a construction having an end seam and a single side seam, i.e. made by folding over a single sheet, and in which the side seam has a tab member inserted in its full length.
Figure 8:
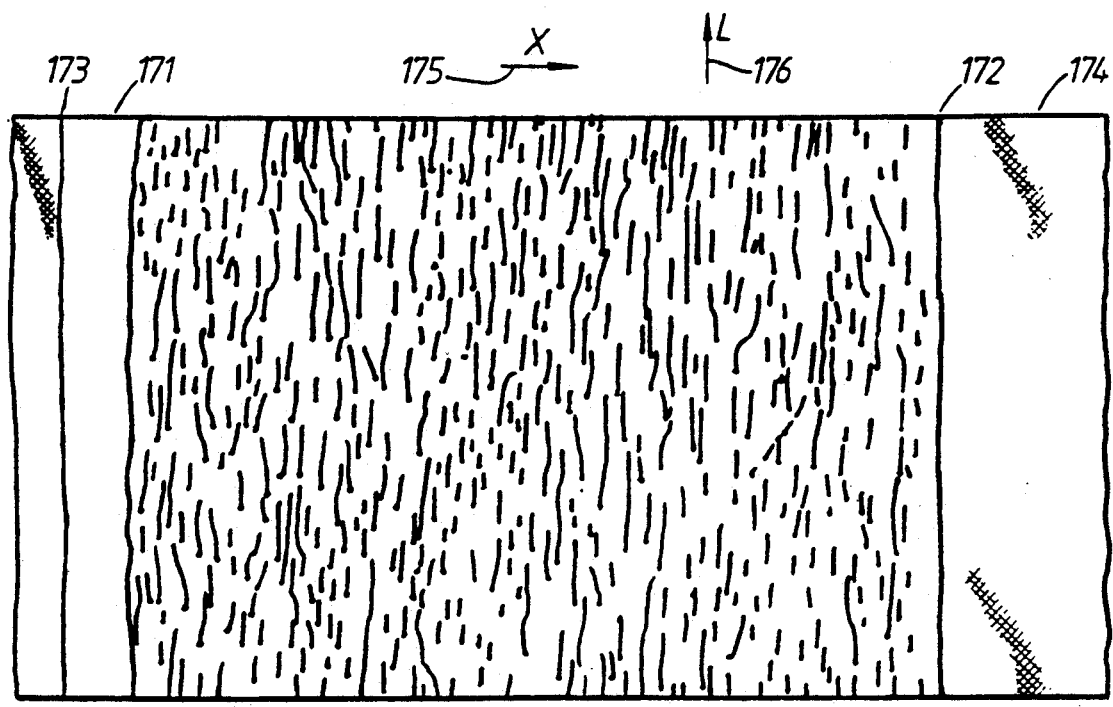
FIG. 8 is a view similar to FIG. 6 but having two side seams each with a tab member inserted in the side seam.

FIGS. 6 to 8 were all made from the same fabric and illustrate three materials having satisfactory properties and made with similar degrees of extension of the fabric before the film is bonded to it but with varying degrees of recovery during subsequent tumble drying of the composite and thus with varying degrees of ruching or corrugation of the film. FIG. 6 had the most recovery and has the most ruching, FIG. 8 the least.

EXAMPLE 1

Figure 1:

This describes the preparation of a composite material as illustrated in FIG. 1. In this figure, there is a warp knitted fabric 100 having a flat face 101 and a looped face 102. The fabric has 10 loops per cm in the X direction (weft) and 10 loops in the Y direction (warp) i.e. 100 loops per sq.cm.

Its extensibility in the X direction is much greater than that in the L direction. When stretched in the X direction ribs become apparent in the flat face. There are 10 ribs per cm in the X direction (in the unstretched state) and these ribs run parallel to the L direction.

Figure 9:
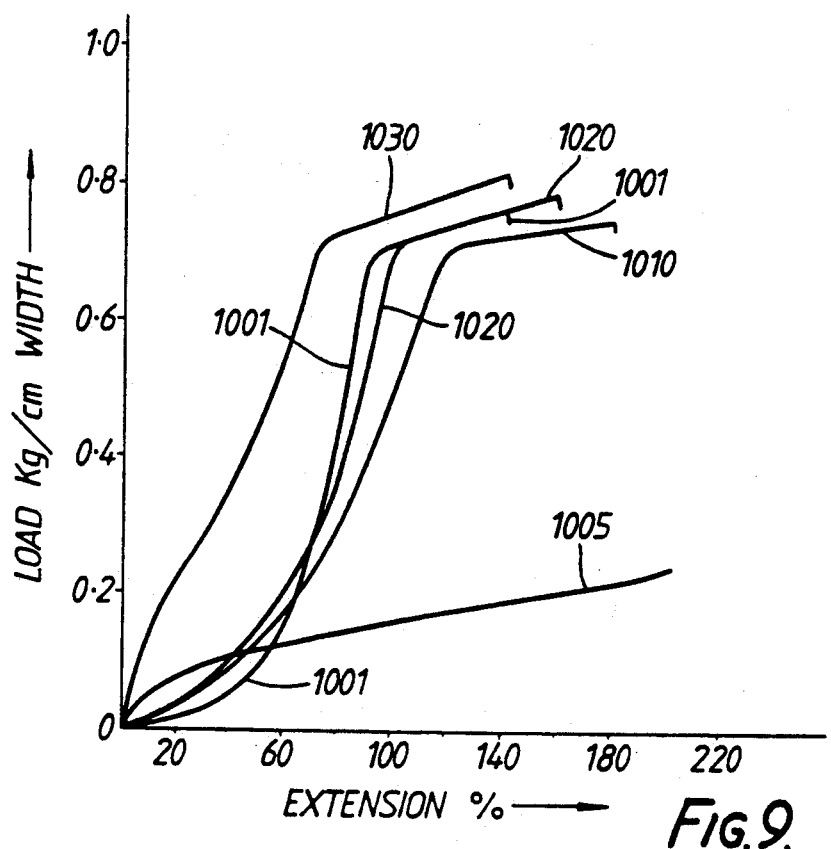
FIGS. 9 and 10 are load/extension curves for two materials made generally as described below for the materials described with reference to FIGS. 6 to 8.

FIG. 9 is a load-extension curve for samples which are being pulled parallel to the L direction.

Figure 10:
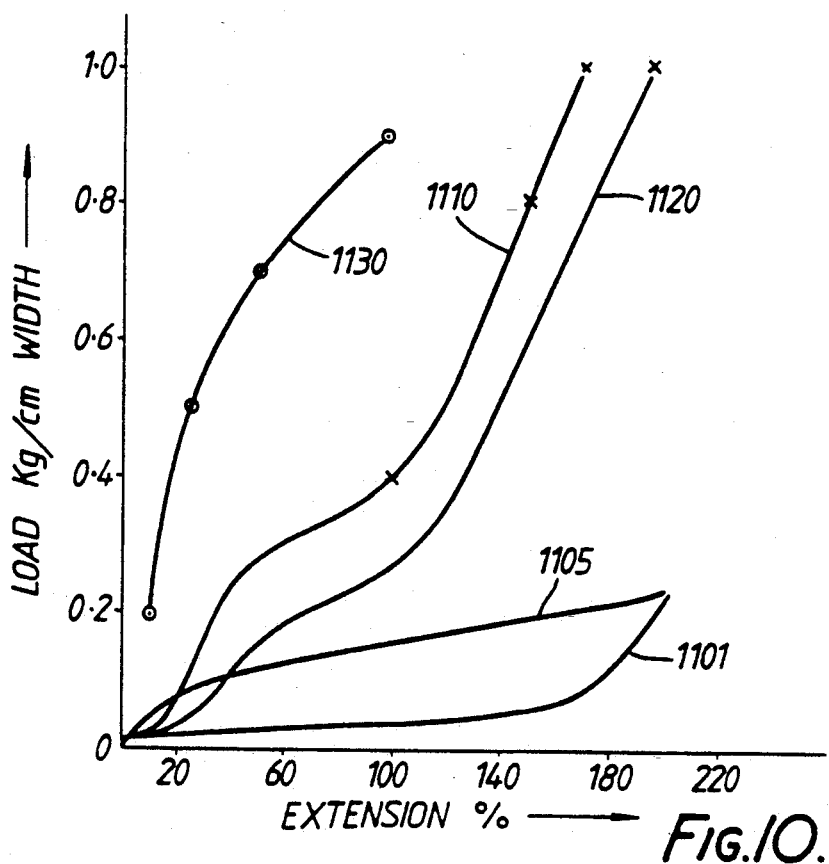

FIG. 10 is a load extension curve for samples which are being pulled parallel to the X direction.

Curves 1001 on FIG. 9 and 1101 on FIG. 10 are for the knitted fabric 100.

These curves are prepared using a J. J. Lloyd Mk 5 Tensile testing machine. The samples are dumbell shaped with the test area being 5 cms long (in the L or X direction depending on the measurement) and 1 cm wide They are cut from the test piece with a die and conditioned for 24 hrs at 20° C. and 50% RH before being tested, and the tests are carried out in the same atmosphere.

The load cell used had a full scale deflection of 1 Kg except for curves 1030 and 1130 (those for the composite made without stretching the knitted fabric before it is laminated to the foil), where a cell with a full scale deflection of 5 Kgs was used. The samples have the dumbell ends gripped in cam operated clamps. The jaws are flat metal jaws with a ribbed roller on a cam.

When the extensibility of a stocking is to be measured the dumbbell shaped samples are cut with their long axis centred on the point MH and parallel to the line B.

The extensibility properties of articles having three or more layers are measured solely on the barrier component.

The sample is positioned between the self clamping jaws in the vertical plane with no slack and the jaws allowed to close. The jaws are then moved apart at a constant rate of 10 cms/minute and the load continuously recorded. The curves end when the sample breaks, the load suddenly dropping. In FIGS. 9 and 10 the actual points of breakage are about 5 to 10% extension beyond the ends of the curves.

Figure 2:
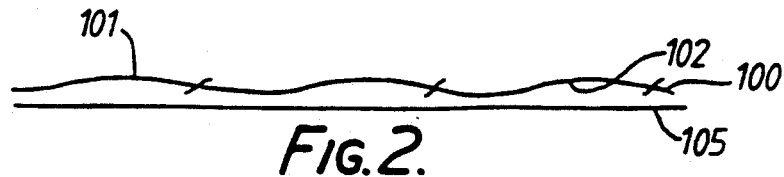
FIG. 2 is a diagrammatic cross-sectional view of the composite in an extended state and also illustrates a step in a preferred process for producing the composite material.

In FIGS. 1 and 2 the polymeric film or membrane resistant to penetration by liquid water but permeable to water vapour is represented by reference 105. As can be seen in FIG. 1 it is corrugated or ruched in the relaxed state and flattened when the composite is stretched. This material is a microporous polyurethane film which is anisotropic in its extensibility properties as can be seen by a comparison of FIGS. 9 and 10 where its load-extension curves are labelled 1005 (L direction) and 1105 (X direction). It is about 55 microns thick.

The film is continuous and microporous.

It preferably has a water vapour permeability (WVP) in excess of 20, preferably in excess of 50 e.g. in excess of 100 and values of WVP of 120 to 140 g per square meter per hour are readily achievable. There is however no necessary upper limit on WVP for the function the film performs in the stocking or other article in use. Values as high as 200 or 250 have already been attained and higher values may be expected with the advance of technology. WVP is measured on the flat film by the procedure described below. The film has a hydrostatic head in excess of 700 cms $H_2O$ as measured by the procedure of B.S.S. 3424 Method 29C modified by placing over the sample a polypropylene grid having grid elements of 1 mm width defining holes each 1 mm by 1 mm to prevent the pressure distorting the film from a flat configuration. (The "holes" or openings constitute 50% of the total area of the grid.) WVP and hydrostatic head values quoted herein are all measured by these two procedures.

Water permeability (WVP) is measured as follows:

A 30 mm high 70 mm diameter polythene sample holder with the top closed with a screw-cap having a 61.5 mm diameter hole in it occupied by a 67.5 mm diameter sample of the microporous material is used in an air-conditioned cabinet maintained at 37°±1° C. and at zero relative humidity by means of silica gel.

25 ml of distilled water are placed within the holder and the change in weight 'w' in a specified time 't' measured 3 hours after placing the jar in the cabinet and again at least 15 hours later is recorded. The water vapour permeability $$'wvp' = \frac{336.6 \, w}{t}$$

grams per square meter per hour at 100% RH and 37° C.

The film 105 used to make the products shown in FIGS. 6,7, and 8 was 55 microns thick and its water vapour permeability was 117 g per square meter per hour. It had a hydrostatic head of in excess of 700 mm $H_2O$ a tensile strength of at least 100 kg/sq.cm and an elongation at break of at least 200% e.g. 200 to 300% especially 220-260%, and a weight of about 30 g/sq.m.

The adhesive used to attach the film 105 to the fabric 100 was applied as a fine dispersed spray so as to deposit separate fine droplets of adhesive on the looped surface 102 of the fabric.

A wide range of adhesives can be used to bond the first film or membrane layer resistant to penetration by liquid water but permeable to water vapour to the second layer of water vapour permeable extensible sheet material, and the invention is not limited to any particular chemical type, form of supply, method or rate of application or curing conditions of the adhesive.

The adhesive can be applied to either or both components to be bonded in the form of powder, hot melt, solution or dispersion, or discontinous net-like sheet.

The adhesive can be of any type, e.g. one forming a bond by solvent evaporation or by coalescence from a dispersion with or without exposure to heat or one functioning by a thermoplastic (e.g. hot melt) mechanism but is preferably of a type which is crosslinkable, or curable, usually upon activation by heat, the crosslinkable nature being an advantage from the standpoint of enhanced resistance to exposure to heat and prolonged contact with water, e.g. on washing.

Crosslinkable polyurethane adhesives are known to give satisfactory results. Such adhesives are commercially available in various forms: as an aqueous dispersion, as a solution in organic solvents, as a powder or solid chip to be used as a hot melt composition or be first dissolved in organic solvents, or as a discontinuous, e.g. net-like sheet.

Adhesives in form of an aqueous dispersion or an organic solvent solution, e.g. polyurethane prepolymers, are frequently hydroxyl- or hydroxyl- and carboxyl-terminated and are blended with a crosslinking agent shortly prior to use. The crosslinking agent may be e.g. aziridine (ethylene imine), a substituted aziridine, a polyfunctional isocyanate prepolymer, a melamine- or urea-formaldehyde resin, or an epoxy composition.

Adhesives in the form of powder or sheet are frequently supplied already compounded with the crosslinking agent but have adequate stability at ambient temperature.

The blended adhesive is typically applied to one or both layers to be bonded at a dry weight of 5 to 50 grams per square meter. The method of application depends on the form in which the adhesive is used and can be e.g. sprinkling for a powder but spraying or gravure printing are preferred for a liquid or hot melt adhesive.

Before bringing the two layers to be bonded into contact, the adhesive should be dry. In the case of adhesives applied in liquid form this is achieved by drying at ambient temperature or at the most at a temperature below that at which crosslinking would take place.

The layers to be bonded, with the second layer of water vapour permeable extensible sheet material previously appropriately stretched, are then brought into intimate contact to effect bonding and crosslinking. For two-dimensional composites this can be achieved in a flat bed or a rotary press. For shaped three-dimensional articles the intimate contact may be achieved by stretching the extensible second layer on a three-dimensional former of appropriately oversized shape in relationship to the shape desired for the eventual product, whereby the second layer becomes stretched prior to coming into contact with the first layer. (Where the shape is complex or in order to ensure and enhance intimate contact between the two layers, the former may be an inflatable former. Such a former has advantages in readily permitting the degree of stretch to be varied as necessary for different materials to be bonded and for different sizes of the article to be made).

The temperature, dwell time and pressure during the bonding will depend on the type of adhesive and nature of the crosslinking agent (if present). As an example a polyurethane adhesive to be crosslinked with a polyfunctional isocyanate will crosslink readily at temperatures from about 70° C. upwards whereas, when using a melamine-formaldehyde resin crosslinking agent, temperatures in excess of 100° C. will be required. In some instances the temperature can be lowered by the use of an accelerator, e.g. an acidic substance for amino-formaldehyde resins.

For a satisfactory and uniform bond to be produced, there should be intimate contact during the bonding but excessive pressures should be avoided.

Clearly the particular bonding conditions to be used can be arrived at by simple experiments on the basis of this teaching, to suit the particular first and second layers to be bonded and the particular type and curing requirements of the adhesive.

In the preparation of the products shown in FIGS. 6,7 and 8 the fabric 100 of plan area 80 cms by 80 cms in area was first sprayed with adhesive while in a relaxed unstretched state resting on a flat horizontal support at 20° C. It was then stretched approximately 50% in the X direction (FIG. 6) whilst not being constrained in the L direction and shrank about 20% in the L direction, its size at this stage being approximately 120 cms by 65 cms. The shrinkage in the L direction was partly restored by pulling out the fabric to 120 cms by 70 cms. This stretching separated loops, the ends of which substantially carried adhesive. While the fabric was stretched, the film 105 in an unstretched state was laid over the adhesive carrying looped face (this condition is shown diagrammatically in FIG. 2) and held pressed against it by a platen.

The fabric thus covered an area of 120 cms × 70 cms = 8,400 sq cms. This is also the surface area of the first material.

The platen extended slightly beyond the edges of the fabric and a load of 3 to 5 kgs/sq.cms was applied to the composite. This load was maintained at 85° C. for 6 seconds with the same stretching force still being applied to the fabric.

The platen was then removed and the stretching force released. The composite was then tumbled in a hot air atmosphere for 10 to 20 minutes and recovered to an area of 100 cms by 65 cms. This condition is shown diagrammatically in FIG. 1.

Thus in the composite material of FIG. 6, the ratio of the surface area of the first material (8,400 sq.cms) to the plan area of the second material under zero stretching conditions (6,500 sq.cms) the ruching factor is 1.3:1.

This procedure was repeated to produce the material shown in FIG. 8. Here the original stretching was also about 50%, the surface area of the first material was also 120 cms by 70 cms, and the plan area of the fabric was 108 cms by 65 cms, i.e. the ruching factor was 1.2:1. The product shown in FIG. 7 was intermediate between those of FIGS. 6 and 8.

Figure 3A:
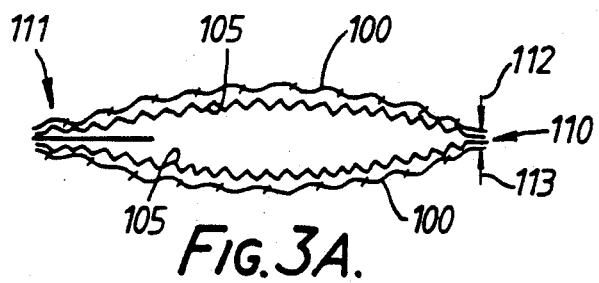
FIGS. 3A and 3B are diagrammatic cross-sectional views of a tubular article made from a composite in accordance with one aspect of the present invention and incorporating another embodiment of the invention namely in situ attachment tabs in the waterproof seam and illustrate steps in a process for making a stocking in accordance with another aspect of the present invention.
Figure 3B:
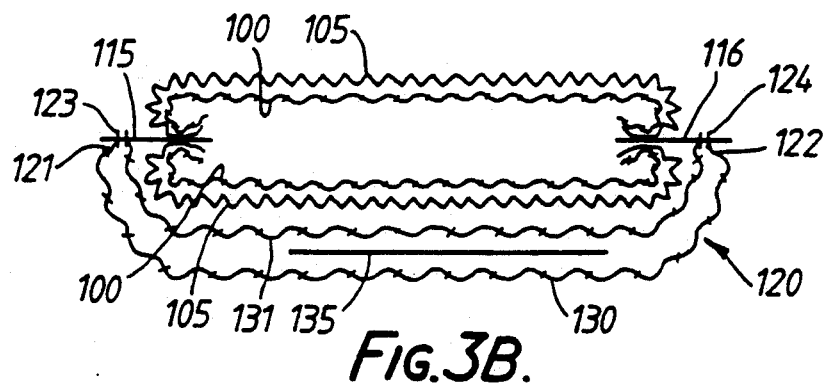
Figure 4:
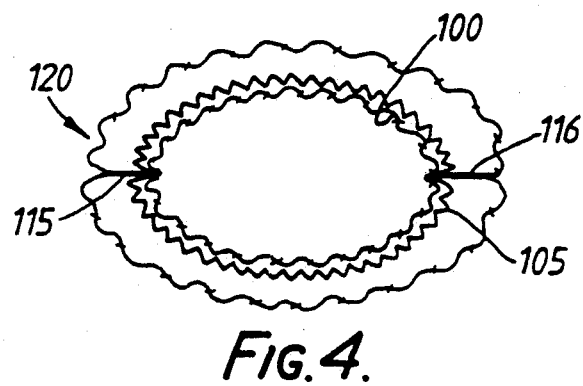
FIG. 4 is a diagrammatic cross-sectional view of a stocking in accordance with the present invention incorporating the component shown in FIG. 3 attached by the tabs to an outer sock.
Figure 5:
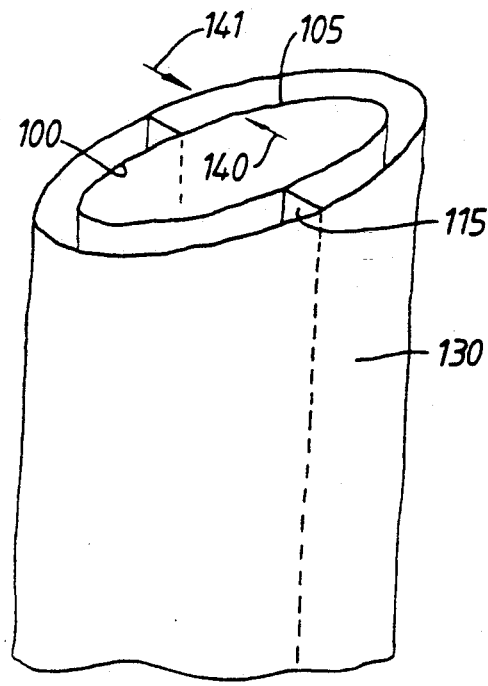
FIG. 5 is a diagrammatic perspective view of the top end of the stocking shown in FIG. 4.

So far only the production of the composite material has been described, turning now to FIGS. 3A, 3B, 4 and 5, FIGS. 3A and 3B show steps in one mode of producing a tubular article and FIGS. 4 and 5 are cross section and perspective views of the finished article namely a stocking (in this instance fashioned).

Referring first to FIG. 3A this shows a first step in the method where two pieces of the composite material shown in FIGS. 1 and 2 are juxtaposed with their fabric sides 100 outwards and their film faces 105 inwards. Two side seams 110 and 111 are formed. The seam 110 is formed by heat welding the two films together by applying heated welding heads along the lines 112 and 113. The seam 111 incorporates a thermally weldable film, fabric or scrim 115 which secures together the two films 105 or if apertured, as when it is a fabric, allows the films to bond through its apertures as well. The result in any event is a waterproof seam both for a seam made as seam 110 and when made as 111. The member 115 functions as a securement tab.

This tubular member which can have (and for a stocking will have) an end seam closing off the toe end is then turned inside out as shown in FIG. 3B so that the fabric 100 is now inside the tube and the film 105 outside. Each side seam in FIG. 3B is shown as having a securement tab 115 and 116.

An outer stocking 120 is shown in FIG. 3B as laid below and parallel and in register with the two component stocking liner of FIG. 3A. FIG. 3B has an exaggerated scale to clarify the relationship between the various elements, and is split between the ends for the same purpose. The edges 121 and 122 of the outer stocking are stitched by rows of stitches 123 and 124 respectively to the securement tabs 115 and 116. The stocking 120 in the multi layer composite of FIG. 3B thus can be considered to provide two layers 130 and 131. If the structure is now turned inside out about the line 135 in FIG. 3B the layer 130 will be moved round to the other side of the whole composite and the structure shown in cross section in FIG. 4 will be obtained, with the outer stocking 120 secured to the inner composite stocking via the securement tabs 115 and 116 with the film 105 providing a continuous waterproof water vapour permeable or so called breathable enclosure for the foot and lower leg which is lined with the fabric 100.

In FIG. 5 the arrows 140 and 141 indicate the ability of water vapour to pass out 140 through the liner but the resistance to the passage of liquid water in 141 through the liner.

The structure shown in FIG. 6 is a composite liner in the condition shown in FIG. 3B. It has a side seam 150 shown without a securement tab. It is possible but not preferred for the composite sock to be made merely with a join at the leg opening. FIG. 6 shows the X and L directions of the fabric by the arrows 151 and 152 respectively.

FIG. 7 is similar to FIG. 6 but shows a structure having a single side seam 160 incorporating a fabric or scrim securement tab 161 along its full length. Also shown is a bottom seam 162 which is also used in the structures of FIGS. 6 and 8 but not shown therein. The X and L directions of the fabric are shown by the arrows 163 and 164 respectively.

FIG. 8 is similar to FIG. 7 but has two side seams 171 and 172 each provided with a full length scrim securement tab 173 and 174.

The X and L directions are shown by the arrows 175 and 176 respectively.

Load extension curves for two materials A and B made generally as described above for FIGS. 6 and 8 are also given in FIGS. 9 and 10. Curve 1010 (L direction—FIG. 9) and curve 1110 (X direction—FIG. 10) are for one of these two materials A; curve 1020 (L direction—FIG. 9) and curve 1120 (X direction—FIG. 10) for the other, B.

Table 1A below gives the loads required to achieve certain % extensions for these composites and the fabric and the film from which these two materials A and B are made.

Load extension curves for a comparison material C, a composite made by the procedure described above for FIGS. 6, 7 and 8 but with no stretching of the fabric prior to adherence i.e. a ruching factor of 1:1 are also given in FIGS. 9 and 10. Curve 1030 is for the L direction and 1130 for the X direction.

Table 1A below also includes values for this material derived from FIG. 9 i.e. for the L direction.

TABLE 1A

| Material | Extn | Load | Extn | Load | Extn | Load |
|---|---|---|---|---|---|---|
| Fabric 100 | 10% | 0.5$^a$ | 50% | 11 | 70% | 34 |
|  |  | 0.004$^b$ |  | 0.088 |  | 0.27 |
| Film 105 | 10 | 6.5 | 50 | 14 | 70 | 19 |
|  |  | 0.052 |  | 0.11 |  | 0.15 |
| A | 10 | 2 | 50 | 16 | 70 | 28 |
|  |  | 0.016 |  | 0.13 |  | 0.22 |
| B | 10 | 2 | 50 | 18 | 70 | 34 |
|  |  | 0.016 |  | 0.14 |  | 0.27 |
| C | 10 | 18 | 50 | 55 | 70 | 85 |
|  |  | 0.14 |  | 0.44 |  | 0.68 |

Table 1B below also includes values for this material derived from FIG. 10 i.e. for the X direction.

TABLE 1B

| Material | Extn | Load | Extn | Load | Extn | Load |
|---|---|---|---|---|---|---|
| Fabric 100 | 10% | 2$^a$ | 50% | 4$^a$ | 70% | 4 |
|  |  | 0.016$^b$ |  | 0.032$^b$ |  | 0.032 |
| Film 105 | 10 | 6.5 | 50 | 14 | 70 | 17 |
|  |  | 0.052 |  | 0.11 |  | 0.146 |
| A | 10 | 4 | 50 | 34 | 70 | 40 |
|  |  | 0.032 |  | 0.27 |  | 0.32 |
| B | 10 | 3 | 50 | 19 | 70 | 25 |
|  |  | 0.024 |  | 0.15 |  | 0.2 |
| C | 10 | 25 | 50 | 88 | 70 | 100 |
|  |  | 0.2 |  | 0.70 |  | 0.8 |

NOTES ON TABLE 1A AND 1B
a) These are scale division readings on the graphs of FIGS. 9 and 10. One scale division=0.2/25 Kgs/cm width=0.008 Kg/cm width.
b) These are loads in Kgs/cm width derived from the scale division readings and quoted to only 2 significant figures.

It will be noted from Tables 1A and 1B and FIGS. 9 and 10 that during the initial elongation of the material A and B the load required is less than that required to stretch the film on its own e.g. at 10% or 20% extension.

It will be noted that the X direction in FIGS. 6, 7 and 8 is transverse to the stocking which in each case is a straight tube and thus the X direction is in essence the same in such a stocking as the heel to front of ankle line. For material B the 50% extension loads are essentially the same in the L and X directions for material A the X load is over twice the L load. It may be preferable to make up the stocking with the direction requiring the lower load transverse to the stocking or parallel to the line B.

It will also be noted that the load required to extend the materials in accordance with the present invention (i.e. A and B) by up to 70% is less than one-half (in fact between 11 and 40%) of the load which is required to extend by the same percentage the comparison material C which is made by a similar procedure but with no stretching of the fabric prior to adhesion of the film.

It is of interest to consider the WVP values (measured under zero stretching load) for various of these materials in juxtaposition to their load extension properties. Table 2 gives certain of these values.

TABLE 2

| Material | WVP | Extn | Load | Extn | Load |
|---|---|---|---|---|---|
| Film 105 | 117 | 10% | 6.5$^a$ | 50% | 14 |
|  |  |  | 0.052$^b$ |  | 0.11 |
| A | 120 | 10 | 2 | 50 | 16 |
|  |  |  | 0.016 |  | 0.13 |
| B | 148 | 10 | 2 | 50 | 18 |
|  |  |  | 0.016 |  | 0.14 |
| C | 102 | 10 | 18 | 50 | 55 |
|  |  |  | 0.14 |  | 0.44 |

Notes on Table 2: See Table 1

Thus a conventionally laminated material C suffers a drop in WVP whilst also being very substantially more difficult to extend. In distinction the products in accordance with the present invention exhibit an improved WVP compared to the film itself and have comparable extension characteristics to the unlaminated film.

It will be observed that the film 105 does not show a yield point but does not break until an elongation of about 200% is reached.

The process by which the composites of the present invention are made involves no stretching of the film but merely stretching of the fabric to which the film is then adhered. The fabrics are only extended by about 50% or more broadly 50 to 150%. Thus in the manufacturing process the film is not subjected to any stretching and in use in the article would not suffer any stretching until the article had been stretched at least about 50%.

It will be observed that the laminate C shows a yield point at about 70% extension while the composites A and B show yield points at 90 to 120% extension; the load at which yielding occurs is about 0.7 kg/cm width in all three cases.

Figure 11:
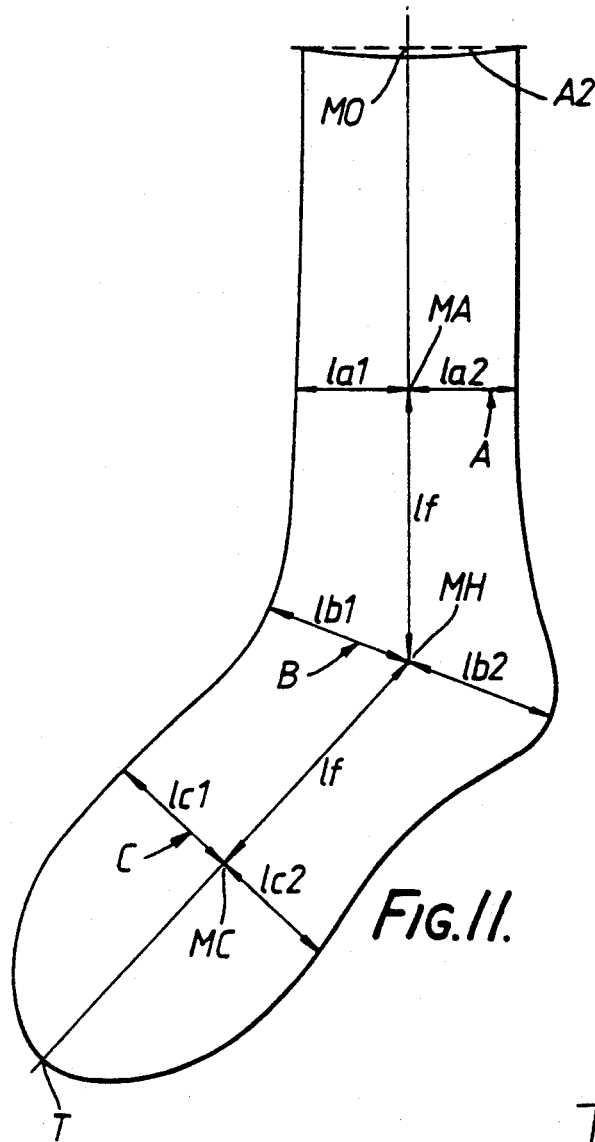
FIGS. 11 and 12 are plan views of two different foot coverings laid out flat, FIG. 11 being in accordance with the invention and FIG. 12 being a prior art article.
Figure 12:
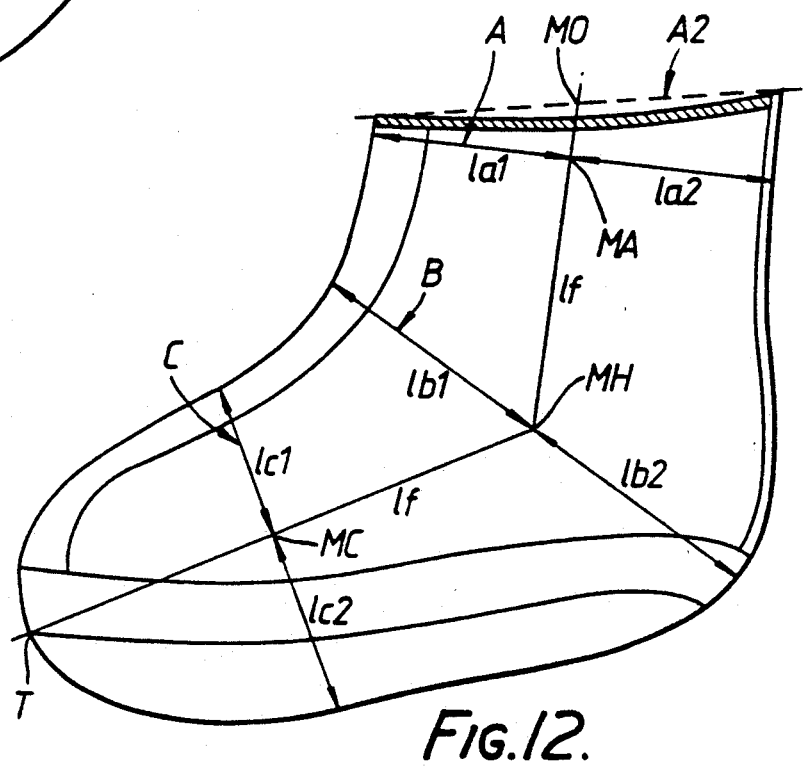

FIGS. 11 and 12 are plan views of foot coverings laid out flat about their front and back edges. They are both shown on the same scale but this is a reduced scale.

FIG. 11 is a stocking of size to fit a foot of sizes 6-9 U.K. shoe sizes. FIG. 12 is a product on sale as a stocking insert sized 9. It is sold to fit over a stocking and to go inside a hiking boot. When a person with size 8½ feet tried it on it was loose fitting when an ordinary stocking was worn and even when a thick stocking was worn there was still a gap at the front of the ankle. It did not fit snugly to the foot.

When a size 8 was tried it could only just be drawn onto the foot and then the sole region was not long enough and there was still a gap at the front of the ankle. The stocking of FIG. 11 fitted closely and snugly over the whole surface of the same persons foot and lower leg and could readily be drawn onto and off the foot over the ankle. A stocking of tubular form such as shown in FIGS. 6, 7, and 8 it will be appreciated has the dimensions (lb1+lb2) equal to (lc1+lc2) and to (la1+la2) or substantially so.

In the product shown in FIG. 11 the dimensions are as follows:

A = 5.7, la1 = 3.0, la2 = 2.7; A2 = 5.5
B = 7.9, lb1 = lb2 = 3.95;
C = 6.9, lc1 = lc2 = 3.45;
lf = 7.1;
(lb1 + lb2)/(lc1 + lc2) = 7.9/6.9 = 1.1;
(lb1 + lb2)/lf = 7.9/7.1 = 1.1;
(lb1 + lb2)/(la1 + la2) = 7.9/5.7 = 1.4; and -continued $$(la1 + la2)/(lc1 + lc2) = 5.7/6.9 = 0.8$$

In the product shown in FIG. 12 the dimensions are as follows:

$$A = 10.5, la1 = 5.1, la2 = 5.3;$$
$$A2 = 10.5;$$
$$B = 13.0, lb1 = lb2 = 6.5;$$
$$C = 9.0, lc1 = 4.1, lc2 = 4.9;$$
$$lf = 7.2;$$
$$(lb1 + lb2)/(lc1 + lc2) = 13/9 = 1.4;$$
$$(lb1 + lb2)/lf = 13/7.2 = 1.8;$$
$$(lb1 + lb2)/(la1 + la2) = 13/10.4 = 1.25;\ \text{and}$$
$$(la1 + la2)/(lc1 + lc2) = 10.4/9.0 = 1.2.$$

The same units are used in each of FIGS. 11 and 12.

The criterion by which the heel to front of ankle line B is drawn is to minimize the length ($lb1+lb2$). The criterion by which the line from MH to the point of the toe T is drawn is to maximize the length of this line.

In accordance with the stocking aspect of the present invention we prefer that the ratio ($lb1+lb2$)/($lc1+lc2$) is less than 1.3 e.g. 1.29 or less or 1.2 or less but particularly that the ratio ($lb1+lb2$)/$lf$ is less than 1.5 e.g. 1.49 or less e.g. not more than 1.4 and particularly less than 1.3, or 1.2.

The ratio ($lb1+lb2$)/$lf$ or B/$lf$ relates to the ease with which the stocking may be placed on the foot; for ease of reference we can call this ratio the ease factor or E.

The ratio of ($la1+la2$)/($lc1+lc2$) or A/C relates to the closeness of fit of the stocking to the wearers lower leg; for ease of reference we can call this ratio the fit factor or F. We prefer this ratio to be less than 1.1 preferably less than 1.0 e.g. less than 0.9 or 0.8. It will be appreciated that a low value of F represents a close fit whilst a high value of E (in the absence of the ability of the article to stretch substantially without a failure in resistance to penetration by liquid water) represents ease of placement of the stocking on the foot. Prior art products show much higher values of the product $E \times F$ or EF than do products in accordance with the present invention. Thus the product of FIG. 12 shows an EF value of 2.1 whilst that of FIG. 11 shows a value of less than 1 namely 0.9. We prefer therefore that the EF value should be less than 1.6 preferably less than 1.5 e.g. less than 1.4 or 1.3.

Two simplified procedures for making stockings and a procedure for making gloves and a procedure for making articles of clothing having arms and/or legs, such as e.g. jackets, anoraks, pullovers, trousers and dry suits, all these articles being waterproof and breathable, will now be described. The first simplified stocking procedure is as follows.

The inner textile layer is a conventional warp knitted woollen stocking provided with a terry towelling loop effect. The outer textile layer is a conventional blended wool and nylon knitted stocking.

The film 105 is the same material as described in the example above but is only 27 to 30 microns thick.

The adhesive used is a discontinuous open mesh stretchy netting of thermoplastic polyurethane in sheet form.

The inner stocking is placed on a 1 cm thick planar fashioned stocking shaped former having rounded edges dimensioned so as to expand the stocking by about 50% along the long heel or heel to front of ankle line (Line B in FIG. 11) and by about 100% across the calf.

A previously prepared bag of the net adhesive is slid over the expanded inner stocking. A bag of unstretched film material, dimensioned to be able to slide over the inner layer on the former without needing to be stretched is made by heatwelding along the edges a pair of suitably dimensioned and shaped sheets. This bag is then slid onto the former over the adhesive net without stretching the film.

The assembly on the former is then placed horizontally in a flat bed press, between two layers of silicone rubber sponge. Both the lower and the upper platen of the press are heated, so that, on closing the press, heat and pressure are applied to both sides of the former through the silicone rubber sponge which is easily deformable.

The three components are thus bonded together to form the barrier component. They are bonded discontinuously over their whole area of contact except for an area 4-5 mm wide extending along the edge of the former.

In a separate operation, the outer stocking is turned inside out and placed on a second former of the same size in a stretched condition. A previously prepared bag of net adhesive is slid over the outer stocking and bonded to it in the press as described above. Release paper is used to prevent the adhesive from sticking to the silicone rubber sponge of the press.

After bonding, the outer stocking adhesive assembly is taken off its former and turned inside out so as to have the adhesive on the inside. It is found that this assembly maintains its stretched size and shape and does not recover at this stage as it has become heat set during the bonding.

The barrier component is still on the first former, and therefore in its stretched state. The outer assembly is next slid over the extended barrier component and is bonded to it in the press as before.

The laminated stocking is taken off the former and wetted with water both inside and outside. It is then tumble dried in a stream of warm air. This makes the stocking recover to near the original dimensions of the inner stocking. Without this treatment recovery of the article is less complete.

The second simplified procedure is as follows.

The adhesive net is replaced by dots of adhesive printed directly on both faces of the film 105. The adhesive used is an aqueous disperson of a hot melt thermoplastic composition. The inner and outer stockings are the same as in the first simplified procedure.

The same former is used and the three components assembled on the former in a single step. The inner stocking is placed on the former thereby becoming expanded as before. A welded bag made from adhesive pretreated unextended membrane is slid over the inner stocking. The outer stocking is then slid over the bag, thereby becoming expanded.

The same press configuration is used as in the first simplified procedure and the adhesive is activated and the film laminated simultaneously to the inner and outer stockings in a single operation.

The product is taken off the former, treated inside and out with water and tumble-dried in a stream of warm air to make it recover to close to the original dimensions of the inner stocking.

The production of a glove will now be described.

The glove which is waterproof and breathable consists essentially of three layers. It may be a sports glove or preferably a dress glove.

The inner layer is a light weight glove which may be a seamless knitted light weight lining glove or may be assembled from flat knitted fabric by cutting and stitching. The middle layer or film 105 is a microporous polyurethane film as described above, preferably about 30 microns thick or more broadly 5 to 200 or 10 to 50 microns thick. The outer layer is any suitable material preferably a water vapour permeable one e.g. a conventional glove such as a dress glove which may be of glove leather or imitations thereof, e.g. a thicker microporous polymer layer or knitted or woven glove fabric.

Figure 13:
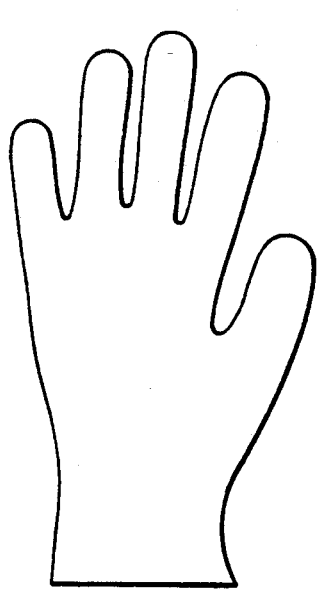
FIG. 13 is a diagrammatic plan view of an inner glove for use in making a glove in accordance with the present invention.

The size and shape of the the inner glove is shown in FIG. 13 (at about 30% of full size).

Figure 14:
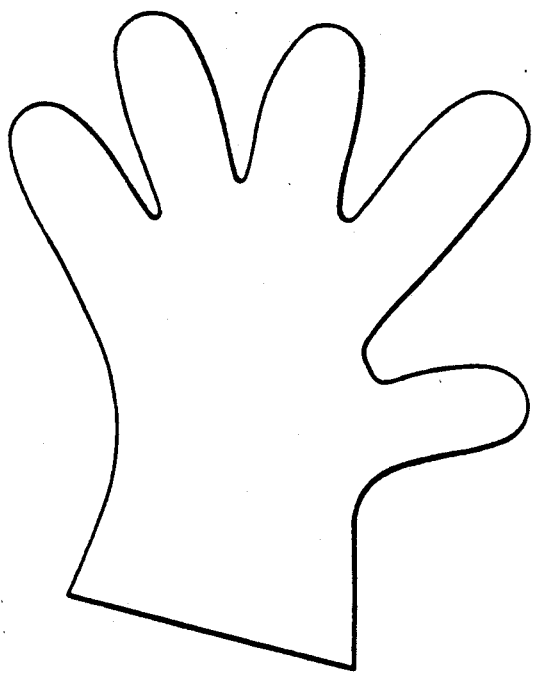
FIG. 14 is a view similar to FIG. 13 and on the same scale of an oversize former over which the inner glove of FIG. 13 is stretched in making a glove in accordance with the present invention.

The inner glove is stretched over an oversize hand shaped former which is thin and planar (e.g. 1-2 mms thick) and has the fingers spread out. The former may be made of wood, metal, plastics or cardboard. A suitable shape of former is shown in FIG. 14 at about 30% of full scale. The oversize is mainly in width being about 100% in the finger, about 40% across the palm of the hand and some 10-15% in length.

When the inner glove is placed on the former, it stretches in width and thereby shortens in length. A lengthwise load is applied however to recover all or part of the lost length. As a result the inner glove is stretched in both directions.

Sheets of the film 105 bearing dots of adhesive (as described in the second simplified procedure for stockings) are then placed in register with each face of the inner glove on the former with the adhesive dots contacting the inner glove. They are then laminated to the inner glove using the press arrangement described in the simplified procedures for stockings. At the same time or subsequently the film is stuck together just outside the periphery of the inner glove preferably by heatwelding and the excess film removed e.g. by cutwelding. Dots of thermoplastic adhesive may optionally be applied to the outer surface of the film 105 in spaced apart locations. These are used to secure the barrier component to the outer glove.

The barrier component so far produced is now drawn off the former and may shrink to some extent but the article is still closer in size to the size of the former than it is to the original inner glove before it was placed on the former.

The barrier component is then wetted with water and tumble dried. Further shrinkage occurs and at this stage the fingers are about 50% wider than the original inner glove, the width across the palm is about 20% greater and the length up to about 10% greater.

Figure 15:
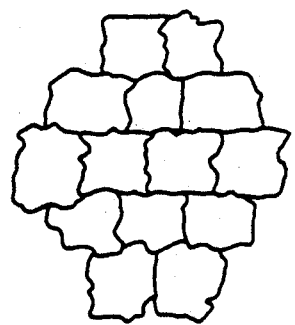
FIG. 15 is a diagrammatic plan view of the puckered appearance of the outer face of a barrier component in accordance with the present invention, as described below in the production of a glove.

The surface of the film which has by the described process been discontinuously adhered to the inner glove has by this stage become visibly puckered or ruched. The puckering is multidirectional and consists of relatively flat islands (at the locations of the adhesive dots) surrounded by a raised folded up lines or regions of material surrounding or substantially surrounding each island. The appearance of the material is shown diagrammatically on an enlarged scale in FIG. 15.

The puckered barrier component is now drawn onto a former of the same configuration as the original former shown in FIG. 14 but of the desired glove size i.e. not oversize. The outer glove is now drawn over the puckered barrier component.

The two parts of the assembly can be connected to each other in a variety of ways.

If adhesive was applied to the outer surface of the film 105 either before or after it was laminated to the inner glove then application of pressure to the three layer composite on the former can be used to achieve bonding as described for the simplified stocking procedure.

The bonding will occur where the adhesive was applied and can thus be discontinuously over the whole front and back faces of the glove or over only one face or over only part of one or both faces or only at certain specific locations, e.g. near the wrist, across the palm or along the fingers and may be on one or both faces or in any combination of these locations. The aim of this bonding is to prevent the barrier component tending to pull out of the outer glove when the hand is removed from the glove.

The production of an article of clothing having arms and/or legs will now be described using as an example a pullover having sleeves.

The pullover which is waterproof and breathable consists essentially of three layers. The inner layer is a knitted garment with sleeves, to be worn on the upper part of the body, e.g. a lightweight cotton thermal vest, or a lightweight woollen or acrylic pullover. The body of the inner garment may be seamless at its sides and along the length of the sleeves. The sleeves are conventionally attached to the body by stitched seams, and other stitched seams may be present, e.g. in the attachment of a collar band and/or sleeve cuffs.

The middle layer or film 105 is a polymeric film or membrane, e.g. the one described above in the process for making gloves. The film is provided on one of its faces with adhesive disposed in a discontinuous pattern, e.g. as dots or lines.

The outer layer is a knitted pullover with sleeves, e.g. woollen or acrylic, of a size when at rest slightly larger than the inner layer garment. The pullover has a ribbed waistband and a pair of cuffs as an integral part of its knitted construction, and is conventionally assembled by stitching together front and back body panels, a pair of sleeves and a collar band. There may also be seams along the length of the sleeves.

The inner layer garment, e.g. the vest, is stretched over an oversize planar and rigid former consisting of a body part and two arms which are in the same plane as the body part but at an angle to it. The oversize is largely across the width of the body and arms, and also under the arms to allow for movement. The oversize may be from 10 to 50% or more of the dimensions of the vest when laid out flat without being stretched.

The first sheet of film 105 with discontinuous adhesive, pre-cut close to the stretched dimensions of the vest but not extending to the waistband, collar band or cuffs, is next placed in register with one face of the vest on the former, with the adhesive towards the vest. The sheet is next bonded to the vest by heat and pressure as previously described.

A second sheet of the film, pre-cut in a similar way but having a small, e.g. 5 mm wide, overhang along the sides of the body and the arms on the former, is then bonded in a similar way to the other face of the vest stretched on the former. The overhang is folded over the surface of the first sheet and similarly bonded. In this way a totally enclosed waterproof breathable polymeric film or membrane envelope is provided over the vest and is substantially co-extensive with the vest.

Both sheets of the film are pre-cut prior to bonding in such a manner as to allow for a small margin, e.g. 5 mm wide, of the fabric of the vest not to be covered by the film or membrane in the area of the waistband, cuffs and collar band.

The vest provided with the polymeric film or membrance envelope, i.e. comprising the barrier component of the ultimate article of clothing, is taken off the former, wetted with water and tumble dried. During this operation the barrier component shrinks to close to the original dimensions of the vest and its membrane side assumes a ruched, puckered or corrugated configuration.

Final assembly of the article of clothing is carried out by stitching the said barrier component to the outer layer, i.e. the knitted pullover, in the areas at the start of, or adjacent to, the waistband, cuffs and collar band. The stitching is done through the small unbonded margin of the inner fabric layer so that the integrity of the polymeric film or membrane envelope remains unaffected. The attachment of the barrier component to the outer layer is located only in peripheral areas of the article of clothing so that the latter affords a high degree of suppleness and comfort in wear.

The waterproof and breathable clothing articles (as herein defined) described above and in earlier parts of this specification comprise a barrier component comprising an inner fabric layer and a film or membrane layer resistant to penetration of liquid water but permeable to water vapour, the barrier component being extensible by at least 50% in at least one direction, and are free of stitched seams passing through the said film or membrane layer so that the integrity of the said layer is unaffected. The articles thus afford resistance to penetration of liquid water without recourse to any form of protection over the seams, such as seam sealing substances or waterproof protective tapes.

When used for the manufacture of the first layer of the various aspects of this invention, the elastomeric polyurethane may be used on its own or as blends with minor proportions say up to 49%, preferably less than 20% of polyvinyl chloride and other polymers and copolymers such as nitrile rubbers including solid copolymers of butadiene and acrylonitrile.

The preferred elastomeric polyurethanes are those having recovery properties intermediate between pure rubbers and pure thermoplastic materials at room temperature.

Polyurethanes may be based on a wide variety of precursors which may be reacted with a wide variety of polyols and polyamines and polyisocyanates. As is well known the particular properties of the resulting polyurethanes to a large extent can be tailored by suitable choice of the reactants, reaction sequence and reaction conditions.

The preferred polymers are elastomeric polyurethanes based on an essentially linear, hydroxyl terminated polyol (a polyester, polyether or a blend of polyols may be used) and a diisocyanate, with a small addition of a difunctional low molecular weight reactant. The last mentioned component may be added either with the other reactants at the start of a one-step polymerisation or at a later stage when it will act primarily as a chain extender or partly at the start and partly later.

Particularly preferred polyurethanes are those derived from polyols by reaction with diols and diisocyanates. As is known from U.S. Pat. No. 2,871,218 many different polyesters, diols and diisocyanates can be used, but a particularly suitable polyester polyurethane system is one in which a polyester made from ethylene glycol and adipic acid is reacted with 1,4-butylene glycol and with 4,4'-diphenylmethane diisocyanate.

In the system in accordance with the above specification the mole ratio of polyester and diol can vary between quite wide limits but the combined number of moles of polyester and diol is arranged to be essentially equivalent to the number of moles of diisocyanate so that the resultant polymer is essentially free of unreacted hydroxyl or isocyanate groups.

The same mole ratios apply if other polyols e.g. polyether are used in place of polyester.

The preferred polyurethane polymers are essentially linear polyurethanes produced from a diisocyanate, a monomeric diol and a polyester or a polyether of molecular weight 1,000 to 3,000, the polyurethane having an intrinsic viscosity in dimethyl formamide of at least 0.5 dl/g.

Especially preferred polyurethanes may have a nitrogen content of about 3.0 to 4.0%, e.g. around 3.5%. Such material can be made by increasing the ratio of polyol to glycol resulting in a lower requirement of diisocyanate as compared to polyurethanes having a higher nitrogen content, such as 4.5% or more.

The polymers may be produced by a bulk polymerisation process and subsequently dissolved in suitable solvents or may be prepared directly in solution by a solution polymerisation process.

The polymer can include conventional stabilisers, fillers, processing aids, pigments, dyes, and additives such as surface active agents or proofing agents, and such additives may replace up to 10% w/w of the polymer.

Further polyurethane systems use polyesters derived from caprolactones. Such polyurethanes are described in British Patent Specification No. 859640.

A particularly preferred type of polyurethane is that made by the novel solution polymerisation process disclosed in U.S. Pat. No. 3,709,864. Such polyurethanes for use in the present invention are desirably characterised by having intrinsic viscosities in the range 0.5 to 0.85 dl/g.

The intrinsic viscosity is determined in highly dilute solution in analytical grade DMF which has been thoroughly dried by storage under a nitrogen atmosphere over a molecular sieve (Linde 5A). Four measurements at 25° C. corresponding to four, approximately equally spaced, concentrations are made and intrinsic viscosity $\eta$ and polymer solvent interaction parameter are determined by the Huggins equation:

$$\frac{\eta\, sp}{C} = [\eta] + K'[\eta]^2\, C$$

when $\eta_{sp}$ is the specific viscosity and C is concentration expressed in g/100 ml, and $[\eta]$ is the intrinsic viscosity, and k' is the Huggins slope constant.

We claim:

1. A composite extensible material useful for making a clothing article comprising a first film layer resistant to penetration by liquid water but permeable to water vapour adhered at discrete securement locations to a second layer of water vapour permeable extensible fabric material, the adherence being such that when the composite material is under zero stretching load and resting on a flat surface the second layer is substantially flat and the first layer is corrugated, ruched or puckered, the adherence being such that the composite material can be stretched by at least 10% in at least one direction by a load less than that required to stretch the said first layer by the same amount on its own.

2. A composite material as claimed in claim 1 in which the second layer is a knitted or woven fabric having a looped structure on at least one surface and the first layer is adhered to the said looped surface.

3. A composite material as claimed in claim 2 in which the first layer is adhered to the second layer by adhesive located between the free ends of the loops of the second layer and the first layer.

4. A composite material as claimed in claim 1 in which the composite material can be extended by 50% in at least one direction by a load not in excess of 0.4 kg/cm width (as measured by the test described herein).

5. A glove comprising at least an inner textile fabric layer, an intermediate film or layer resistant to penetration by liquid water but permeable to water vapour and an outer layer, the inner layer and the intermediate layer constituting a barrier component, the barrier component being a composite material as claimed in claim 1, whereby whilst the glove fits closely to the hand and fingers, the fist can still be easily clenched.

6. A stocking made of material comprising a barrier component the barrier component being a material as claimed in claim 1, wherein when worn the stocking fits closely to the surface of the foot, ankle and leg, and being such that it can readily by drawn onto and off the foot and over the ankle.

7. A stocking as claimed in claim 6 in which the barrier component comprises an inner fabric layer and a separately formed hydrophobic polymer layer resistant to penetration by liquid water but permeable to water vapour, the stocking being seamless or having no more than one seam which is located in the polymer layer.

8. A clothing article which comprises a composite material as claimed in claim 1, the article being free of stitched seams passing through the said film layer and affording resistance to penetration of liquid water without recourse to any form of additional protection over the seams.

9. A composite material as claimed in claim 1 in which the layer resistant to penetration by liquid water but permeable to water vapour is afforded by a single layer of hydrophobic microporous polymer film, which is flexible and 5 to 200 microns thick.

10. An article of clothing incorporating a composite material as claimed in claim 1.

11. A method of making a composite extensible material useful in making a clothing article comprising providing a first film layer resistant to penetration by liquid water but permeable to water vapour, providing a second layer of water vapour permeable extensible fabric material in juxtaposition to said first film layer and stretching said second layer with respect to said first layer, adhering at discrete securement locations said first layer to said second layer while said second layer is stretched such that when the composite material is under zero stretching load and resting on a flat surface the first layer is corrugated, ruched and puckered, the adherence being such that the composite material can be stretched by at least 10% in at least one direction by a load less than that required to stretch the first layer by the same amount on its own.

12. A method as claimed in claim 11 in which the second layer is a knitted or woven fabric having a looped structure on at least one surface, and the first layer is juxtaposed to the said looped surface.

13. A method as claimed in claim 11 in which, after the layers are adhered with the second layer held in the stretch state, the composite material is released so that he second layer contracts, or is treated so that the second layer contracts and the first layer thereby adopts a corrugated, ruched or puckered configuration.

14. A composite material or an article whenever made by a method as claimed in claim 11.

* * * * *